(12) United States Patent
Chipchase

(10) Patent No.: US 7,304,563 B2
(45) Date of Patent: Dec. 4, 2007

(54) ALARM CLOCK

(75) Inventor: Jan Chipchase, Tokyo (JP)

(73) Assignee: Nokia Corporation, Espoo (FI)

( * ) Notice: Subject to any disclaimer, the term of this patent is extended or adjusted under 35 U.S.C. 154(b) by 73 days.

(21) Appl. No.: 10/957,743

(22) Filed: Oct. 5, 2004

(65) Prior Publication Data

US 2006/0071801 A1    Apr. 6, 2006

(51) Int. Cl.
*G08B 25/00* (2006.01)

(52) U.S. Cl. .............................. 340/309.15; 340/539.1; 340/541; 340/825.36; 379/93.01; 379/1.01; 368/12

(58) Field of Classification Search ............. 340/309.7, 340/7.58, 309.16, 825.36, 539.1, 7.6, 541, 340/309.15; 379/40, 106.06, 1.01, 350, 93.26, 379/68, 93.01
See application file for complete search history.

(56) References Cited

U.S. PATENT DOCUMENTS

| | | | | |
|---|---|---|---|---|
| 4,872,005 A | * | 10/1989 | DeLuca et al. | 340/7.41 |
| 5,475,380 A | * | 12/1995 | Shim | 340/7.41 |
| 5,493,611 A | * | 2/1996 | Hubert | 379/387.01 |
| 5,943,626 A | | 8/1999 | Nam | |
| 6,678,215 B1 | * | 1/2004 | Treyz et al. | 368/10 |
| 6,714,486 B2 | * | 3/2004 | Biggs | 368/82 |
| 6,940,395 B2 | * | 9/2005 | Steinmark | 340/309.16 |
| 6,958,692 B1 | * | 10/2005 | Ratschunas | 340/539.13 |
| 2005/0169110 A1 | * | 8/2005 | Mazzilli et al. | 368/73 |

FOREIGN PATENT DOCUMENTS

| | | |
|---|---|---|
| GB | 2317784 A | 4/1998 |
| JP | 03262241 | 11/1991 |
| JP | 08237339 | 9/1996 |
| WO | WO2004/025934 | 3/2004 |

* cited by examiner

*Primary Examiner*—Benjamin C. Lee
*Assistant Examiner*—Daniel Previl
(74) *Attorney, Agent, or Firm*—Squire, Sanders & Dempsey L.L.P.

(57) ABSTRACT

A mobile communication terminal comprising: a clock for maintaining an indication of the current time; a memory for storing a definition of an alert time; and an alerting unit configurable to issue an alert when the current time matches the alert time, the alerting unit being capable of issuing the alert by initiating a connection to another communication terminal over a network so as to cause that other terminal to locally signal the incidence of the connection incoming thereto.

16 Claims, 1 Drawing Sheet

ALARM CLOCK

BACKGROUND OF THE INVENTION

This invention relates to alarm clock and timer functions, especially for communication terminals.

Many people use alarm clocks to help them wake up in the morning. Many devices, including communication terminals, offer alarm clock functionality. The normal method of operation is that a user indicates a time to the alarm clock device. When a timer in the device matches the time indicated by the user the device sounds an alarm. The user can stop the alarm from sounding, normally by pressing a button on the device.

There are situations in which this type of alarm is insufficient. Even if a person is technically awake they are not necessarily conscious of what they are doing. If the user is deeply asleep or very tired then he might stop the alarm and then inadvertently go back to sleep without actually getting up. In such 'early morning' situations users often rely on ingrained behaviour. These situations can be ones where the user is the most keen that the alarm should wake him: for example he might need to get up early for a flight, after a particularly heavy drinking session the night before or when simply being exhausted.

To overcome this problem some people try putting their alarm clocks at the bottom of their bed, or on the other side of the bedroom, but it can be difficult to remember to do that.

Some other types of alarm facility are more effective. For example, hotels often offer a wake-up call service to telephone a guest at a pre-arranged time. An alarm telephone call of this type is often more likely to wake the guest than an alarm clock would be. The guest has to pay more attention to answering a phone call than to cancelling an alarm clock, and the phone call is more likely to make the user alert because answering the phone requires more concentration. This service is not so readily available to the public when they are at home. However, some telephone operators offer a centrally run alarm call service to home telephone numbers. A subscriber can call a network service centre from his home phone and indicate a time at which he wants to be called. The service centre returns the call at the indicated time. The user has to pay a premium charge for this service.

There is therefore a need for an improved form of alarm.

SUMMARY OF THE INVENTION

According to the present invention there is provided a mobile communication terminal comprising: a clock for maintaining an indication of the current time; a memory for storing a definition of an alert time; and an alerting unit configurable to issue an alert when the current time matches the alert time, the alerting unit being capable of issuing the alert by initiating a connection to another communication terminal over a network so as to cause that other terminal to locally signal the incidence of the connection incoming thereto; wherein the alerting unit comprises a signaling unit configured to locally signal to a user; the memory is configured to store an indication of whether the alerting unit is configured to issue the alert using the signalling unit, and the alerting unit is configured to issue the alert using the signalling unit in accordance with that indication; and the alerting unit is configured to issue the alert by initiating the connection to another communication terminal at a predetermined time offset from signalling the user using the signalling unit.

The present invention also provides a method for alerting a user by means of a mobile communication terminal, the method comprising: maintaining by means of a clock an indication of the current time; storing in a memory a definition of an alert time; issuing an alert when the current time matches the alert time by initiating a connection to another communication terminal over a network so as to cause that other terminal to locally signal the incidence of the connection incoming thereto, issuing an alert by the terminal locally signalling to a user;

storing an indication in the memory of whether the alert is to be issued locally by the terminal; and issuing an alert by initiating the connection to the other communication terminal at a predetermined time offset from locally signalling to a user.

The alerting unit comprises a signaling unit capable of locally signaling to a user, and the alerting unit is capable of issuing the alert by causing the signaling unit to locally signal to a user.

The memory is capable of storing an indication of whether the alerting unit is to issue the alert by means of the signaling unit, and the alerting unit is arranged to configured to issue the alert by means of the signaling unit in accordance with that indication.

The alerting unit is configured to issue the alert by initiating the connection to another communication terminal at a predetermined time offset from signaling the user by means of the signaling unit.

Preferably the said connection to another communication terminal is a phone call.

Preferably the mobile communication terminal is capable of wireless communication with a communication network and the said connection is communicated over a wireless link with the network.

Preferably the communication terminal is a mobile phone.

The mobile communication terminal preferably comprises a user interface whereby a user can enter data for storage by the memory.

Preferably the terminal is configured to enable a user to enter the alert time by means of the keypad and to store that time in the memory.

Preferably the terminal is configured to enable a user to enter the address of the other communication terminal by means of the keypad and to store that time in the keypad, and wherein the alerting unit is configured to initiate the connection to that terminal by means of that address.

Preferably the address is a telephone number.

The communication terminal preferably comprises a message generation unit for generating an audible message defined by data stored at the communication terminal, and wherein the alerting unit is arranged to play out that message over the connection.

Preferably the terminal is portable.

Preferably the terminal is a battery-powered terminal.

The method preferably comprises locally signaling the incidence of the incoming connection by means of the said other terminal. Preferably the said signaling is audible signaling. Preferably the audible signaling is a ring tone.

The present invention will now be described by way of example with reference to the accompanying drawing.

DETAILED DESCRIPTION OF PREFERRED EMBODIMENTS

Figure 1:
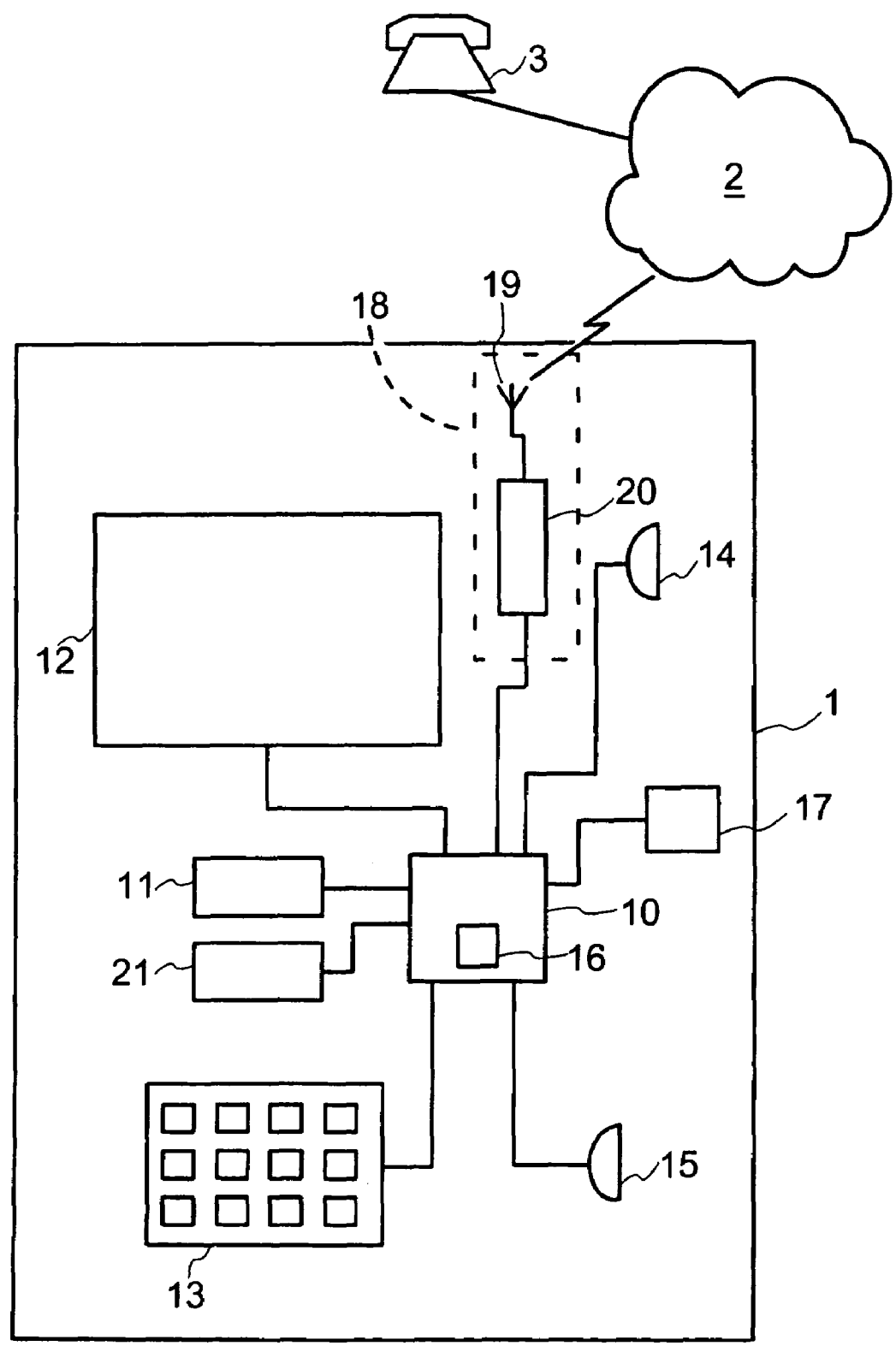
FIG. 1 is a schematic diagram of a telecommunications system, including a communication terminal whose architecture is shown in detail.

In a preferred embodiment of the present invention a mobile phone 1 offers an alarm clock facility. In one mode of operation, at the pre-defined alarm time the alarm clock facility not only sounds an alarm from a loudspeaker in the mobile phone, but also calls a pre-defined telephone number, which would typically be the home phone number of the user. Thus the user can be woken not just by the alarm generated by the mobile phone, but also by an incoming phone call to his home phone number.

The system shown in FIG. 1 will now be described in more detail.

The system of FIG. 1 comprises a telecommunications network 2. A number of terminals 1, 3 are connected to the network, and the network can switch communications between the terminals in the usual way. Terminal 1 represents a mobile telephone, which accesses the network wirelessly. Terminal 3 represents a land-line telephone.

Mobile phone 1 comprises a central processing unit 10, which controls the operation of the phone in accordance with software stored in a read only memory 11. The central processing unit is connected to a display 12 for displaying information to a user, a keypad 13 for obtaining input from a user, a loudspeaker 14 for outputting audio to be heard by the user and a microphone 15 for receiving audio from the user. The central processing unit contains random access memory 16 that can be used for storing temporary data. The central processing unit implements a real-time clock under the control of a timing circuit 17 such as a crystal oscillator.

The mobile phone also has a communication subsystem 18 for communicating with a mobile telephony network. The communication subsystem comprises an antenna 19 and a communication engine 20. The communication engine 20 is connected between the antenna and the processor 10. The communication engine handles conversion between baseband and radio frequency and handles signalling communications with the wireless network. At least some functional elements of the communication engine may be implemented on a common chip with one or more parts of the central processing unit.

The processor has access to a non-volatile memory 21 for storing user settings.

The mobile phone may be operable in accordance with any suitable communications protocol. Examples include GSM and 3G (UMTS).

The software stored in the memory 11 allows the state of the phone to be controlled by means of the keypad 13, and allows the processor to cause the display 12 to provide an output dependent on the status of the phone.

The phone provides an alarm clock function. To operate the alarm clock function the user uses keypad 13 to navigate a menu system defined by the software and selects an alarm clock setting mode. In the alarm clock setting mode the user can enter a time of day and optionally a date at which the alarm is to sound. The user can then indicate to the phone whether the alarm is to be active or inactive. The value of the entered time and date and the status of the alarm are stored by the processor 10 in memory 21. The user can then leave the alarm clock setting mode. When the alarm is active the processor 10 compares the value of its real-time clock with the time (and, if any, date) entered by the user. When the clock matches the entered time and optionally date the processor activates an alarm. In one type of alarm operation it activates the alarm by causing the loudspeaker 14 to emit a noise. A user can stop the noise by means of the keypad 13.

In the alarm clock setting mode the user can also set the type of alarm he requires. Two types of alarm are available, and can be selected independently or in combination.

The first type of alarm is an alarm signalled locally at the phone. This could be signalled by means of the loudspeaker, as described above, or by means of a light or a vibrating unit or by another form of local alerting device if the phone were so equipped, The second type of alarm is an alarm generated by means of a call to another phone. In the alarm setting mode the user can select a telephone number for use in the second type of alarm. The telephone number is stored in non-volatile memory 21. The telephone number could conveniently be a telephone number in use at the location where the user will be when the alarm is to sound: for example his home phone number or the phone number of another mobile phone that he has at home. When the alarm is active and the clock matches the entered time and optionally date the processor generates the alarm of the second type by calling the telephone number. When the call is answered the phone 1 may automatically terminate the call immediately so as to avoid incurring the cost of a call if possible. Alternatively it may play out a message. The message could be stored in the software in the phone and may say, for example: "This is an alarm call from your Nokia phone. The time is xx.xx". Alternatively, the message could be recorded by the user and stored by the phone in non-volatile memory 21. The call can be terminated in the normal way from the answering terminal (e.g. terminal 3). The call can also be terminated from the phone 1.

On making the call the menu system of the phone adopts a mode in which the call cannot be cancelled merely by pressing a single button on the keypad. Multiple keypresses, and preferably multiple non-obvious key-presses are required. This inhibits a user from absent-mindedly cancelling the call from phone 1 without answering the call from the receiving phone.

Using the second type of alarm call the user can have the phone 1 make an alarm call to a phone number of his choosing at a predetermined time.

The phone may store a default telephone number for use in the second type of alarm. The user may select a telephone number for use in the second type of alarm either by entering it digit-by-digit or by selecting it from a list of numbers stored in the memory of the phone and/or from a list of names associated with such numbers.

If the user selects to have alarms of both the first and the second types, the alarms may both be generated at the same time. Alternatively, the phone could generate the alarm of one type slightly after the other (e.g. one or two minutes later) so that the user is disturbed separately by each alarm. Preferably the alarm of the second type is generated first, but the opposite is also possible.

The user can set various options such as the length of time the phone 1 should ring the phone number for the second type of alarm before automatically hanging up, the number of times the phone number will be repeatedly called until it is answered and at what frequency, and the length of time between calling and the phone alarm going off. The length of time for which the phone number is rungs can be automatically shortened/adjusted based on the time required to answer previous alarms.

Preferably the alarm of the second type is not activated by default whenever a user sets up an alarm. This avoids the possibility that the phone will call a default alarm phone number when the user is not at a location where he can answer calls to that number. For instance if the user is away from home then he will not want his home phone number to be called by accident when the alarm goes off.

The alarm function as described above can also be used to wake people who are at different locations. The phone number entered for the alarm of the second type could be a number for a phone at a location remote from the phone 1. The alarm of the first type can then wake someone at the location of the phone, and the alarm of the second type can wake someone at the remote location. As described above, the person answering the call could be greeted with a message when the call is answered, for instance "good morning darling". To allow people to be woken at more than one remote location the phone could allow multiple phone numbers to be selected for the second type of alarm, and could ring all of them in turn when the alarm is activated.

The principles described above with regard to the first and second types of alarm could be used to alert users to events from other functions than an alarm clock function. Alarms of the first and/or second types could be generated in response to other time management features such as diary entries for shared reminders or meetings.

Instead of calling a phone as described above, the second type of alarm could be generated by signaling other types of devices that can be signaled by the phone 1 over the network 2. For example, the phone could signal a network-connected hi-fi system to turn on at the time indicated by the alarm.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A mobile communication terminal, comprising:
a clock configured to maintain an indication of the current time;
a memory configured to store a definition of an alert time; and
an alerting unit configured to issue an alert when the current time matches the alert time, the alerting unit being configured to issue the alert by initiating a connection to another communication terminal over a network so as to cause that other terminal to locally signal the incidence of the connection incoming thereto,
wherein the alerting unit comprises a signaling unit configured to locally signal to a user, and the alerting unit is configured to issue the alert by causing the signaling unit to locally signal to the user,
wherein the memory is configured to store an indication of whether the alerting unit is configured to issue the alert using the signaling unit, and the alerting unit is configured to issue the alert using the signaling unit in accordance with that indication, and
wherein the alerting unit is configured to issue the alert by initiating the connection to the other communication terminal at a predetermined time offset from signaling the user using the signaling unit.

2. The mobile communication terminal as claimed in claim 1, wherein the connection to another communication terminal is a phone call.

3. The mobile communication terminal as claimed in claim 1, wherein the mobile communication terminal is configured to perform wireless communication with a communication network and the connection is communicated over a wireless link with the network.

4. The mobile communication terminal as claimed in claim 1, wherein the communication terminal is a mobile phone.

5. The mobile communication terminal as claimed in claim 1, comprising a user interface whereby a user can enter data for storage by the memory.

6. The mobile communication terminal as claimed in claim 5, the terminal being configured to enable a user to enter the alert time by means of the keypad and to store that time in the memory.

7. The mobile communication terminal as claimed in claim 6, wherein the address is a telephone number.

8. The mobile communication terminal as claimed in claim 5, the terminal being configured to enable a user to enter the address of the other communication terminal by means of the keypad and to store that time in the keypad, and wherein the alerting unit is configured to initiate the connection to that terminal by means of that address.

9. The mobile communication terminal as claimed in claim 1, comprising a message generation unit for generating an audible message defined by data stored at the communication terminal, and wherein the alerting unit is arranged to play out that message over the connection.

10. The mobile communication terminal as claimed in claim 1, wherein the terminal is portable.

11. The mobile communication terminal as claimed in claim 1, wherein the terminal is a battery-powered terminal.

12. A method for alerting a user of a mobile communication terminal, the method comprising:
maintaining by a clock an indication of the current time;
storing in a memory a definition of an alert time;
issuing an alert when the current time matches the alert time by initiating a connection to another communication terminal over a network so as to cause that other terminal to locally signal the incidence of the connection incoming thereto;
issuing an alert by the terminal locally signaling to the user;
storing an indication in the memory of whether the alert is to be issued locally by the terminal; and
issuing an alert by initiating a connection to the other communication terminal at a predetermined time offset from locally signaling to the user.

13. The method as claimed in claim 12, comprising locally signaling the incidence of the incoming connection by means of the other terminal.

14. The method as claimed in claim 13, wherein the signaling is audible signaling.

15. The method as claimed in claim 14, wherein the audible signaling is a ring tone.

16. An apparatus for alerting a user by means of a mobile communication terminal, the apparatus comprising:
maintaining means for maintaining an indication of the current time;
storing means for storing in a memory a definition of an alert time; and issuing means for issuing an alert when the current time matches the alert time by initiating a connection to another communication terminal over a network so as to cause that other terminal to locally signal the incidence of the connection incoming thereto wherein the means for issuing an alert comprises signaling means for locally signaling to the user, wherein the means for issuing an alert issues the alert by causing the signaling means to locally signal to the user, wherein the storing means stores an indication of whether the means for issuing an alert is to issue the alert using the signaling means, and wherein the means for issuing an alert issues an alert by initiating a connection to the other communication terminal at a predetermined time offset from signaling the user by the signaling means.

* * * * *